United States Patent [19]
Brady et al.

[11] Patent Number: 5,430,782
[45] Date of Patent: Jul. 4, 1995

[54] CALLER DIRECTED ROUTING OF TOLL FREE CALLS USING VARIABLE PREFIXES

[75] Inventors: Christopher J. Brady, Rumson; Shri P. Jain, Marlboro, both of N.J.

[73] Assignee: AT&T Corp., Murray Hill, N.J.

[21] Appl. No.: 937,796

[22] Filed: Aug. 28, 1992

[51] Int. Cl.⁶ .............................................. H04M 3/42
[52] U.S. Cl. ................................. 379/201; 379/212; 379/207; 379/220
[58] Field of Search ............... 379/201, 207, 212, 211, 379/216, 207, 234

[56] References Cited

U.S. PATENT DOCUMENTS

| | | | |
|---|---|---|---|
| 4,191,860 | 3/1980 | Weber | 179/18 |
| 4,748,661 | 5/1988 | Edelstein et al. | 379/216 X |
| 4,757,267 | 7/1988 | Riskin | 379/201 |
| 4,797,915 | 1/1989 | Bowker et al. | 379/216 |
| 4,827,500 | 5/1989 | Binkerd et al. | 379/88 |
| 4,922,519 | 5/1990 | Daudelin | 379/223 |
| 5,003,584 | 3/1991 | Benyacar et al. | 379/91 X |
| 5,018,191 | 5/1991 | Catron et al. | 379/207 X |

OTHER PUBLICATIONS

AT&T "Notes on the Network" 1980 p. 6 Section 2.
Bell Atlantic, "Return Call," Feb. 1990 SSI #700 215 774.
Bell Atlantic, "Intercom Extra," Feb. 1990 SSI #700 221 175.
Bell Atlantic, "Select Forward," Feb. 1990 SSI #700 217 583.

*Primary Examiner*—James L. Dwyer
*Assistant Examiner*—Daniel S. Hunter
*Attorney, Agent, or Firm*—Frederick B. Luludis

[57] ABSTRACT

The utility of 800 service telephone calls is enhanced by associating an 800 service telephone number with a number of different prefixes other than the prefix of one. In this way the caller may control to a certain degree certain aspects in the processing of an associated 800 service call. For example, a caller may specify a grade of service or the routing for the associated 800 service call.

7 Claims, 3 Drawing Sheets

FIG. 2

| 1-800-949-5555 | |
|---|---|
| ANI/USER ENTERED DATA | DESTINATION |
| 201-899-aaaa<br>201-899-bbbb<br>\|<br>\|<br>201-739-cccc<br>\|<br>\|<br>201-739-dddd | 201-899-5555 |
| 908-370-eeee<br>201-307-ffff<br>\|<br>\|<br>908-431-gggg<br>\|<br>\|<br>908-431-hhhh | 201-431-5555 |
| 609-905-iiii<br>\|<br>\|<br>908-928-jjjj<br>\|<br>\|<br>908-698-kkkk | 908-698-555 |

300 — (table)
301 — 908-370-eeee

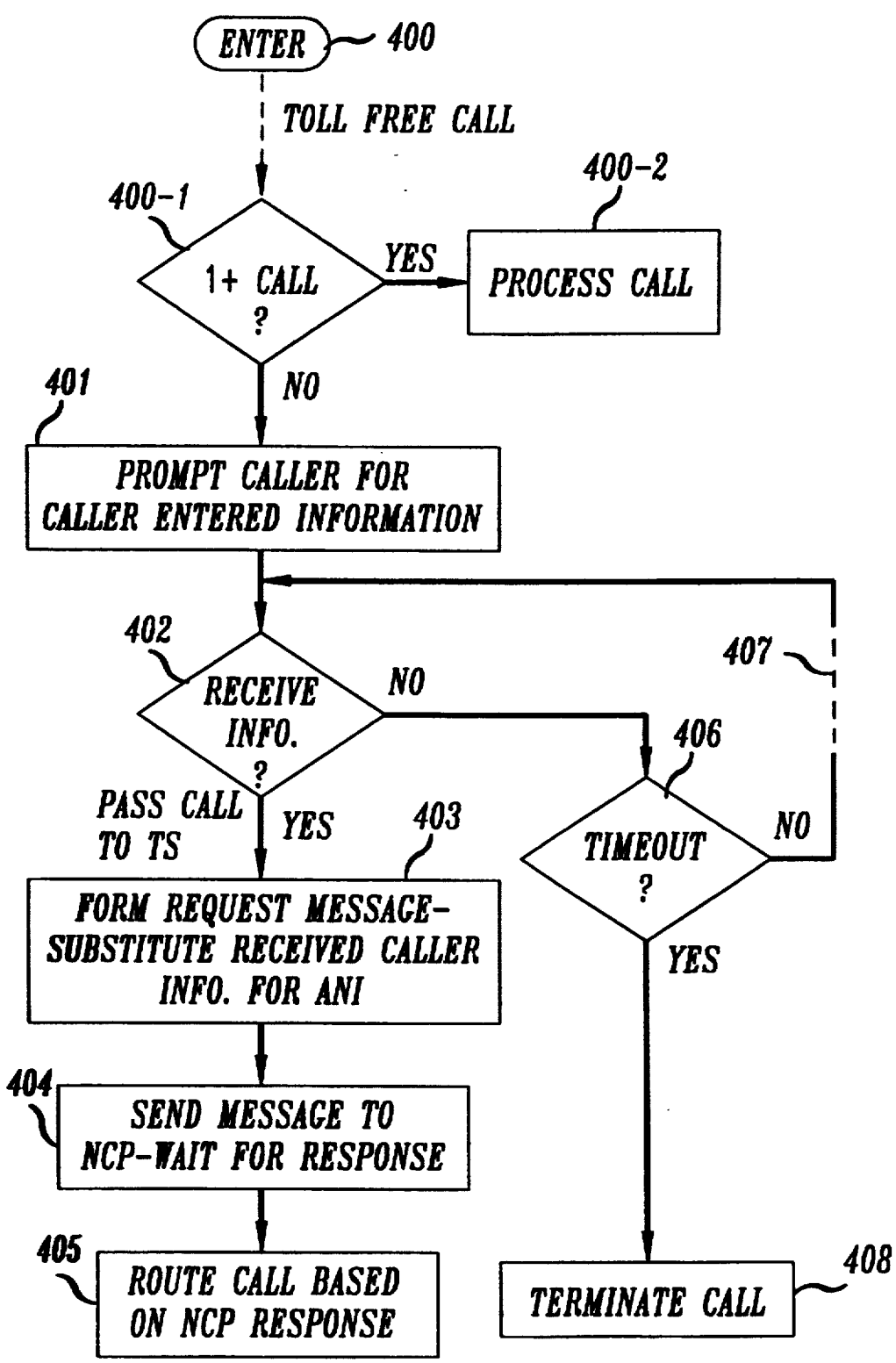

CALLER DIRECTED ROUTING OF TOLL FREE CALLS USING VARIABLE PREFIXES

TECHNICAL FIELD

The invention relates to telecommunications systems and, more particularly, relates to toll free calls, such as 800 telephone calling services.

BACKGROUND OF THE INVENTION

Most major interexchange telephone carriers provide what is commonly referred to as 800 telephone calling services. As is well-known, 800 telephone calling services is associated with Direct Distance Dialing (DDD) defined by a predetermined prefix code, namely the digit "1".

In most cases, an 800 service subscriber is a business, which typically advertises its associated 800 telephone number as a way of soliciting business from the general public. To enhance such solicitation, one interexchange carrier provides a locator service which connects a caller who dials an 800 service number associated with a multilocation company to that one of the company's locations that is most convenient to the caller, often a location that is within the neighborhood of the calling telephone station set.

SUMMARY OF THE INVENTION

We have recognized that although 800 telephone calling services provides a number of advantages, it is, nevertheless, somewhat inflexible. The reason for this is likely due to the fact that 800 telephone calling services is tied to the DDD dialing code. As a result of such inflexibility, such services do not allow a caller to specify a particular call processing treatment for an associated 800 service call. For example, in certain instances a caller may prefer a connection to a business location that is convenient to a telephone station set other than the calling telephone station set. As another example, a caller may prefer to specify a particular grade of service in conjunction with the placing of an 800 service to help ensure that the call is not blocked or directed to busy tone.

Accordingly, to satisfy these and other caller preferences, we have enhanced 800 calling services so that in placing an 800 service call a caller may, in accord with an aspect of the invention, associate different call treatments with different prefix codes having values other than the digit "1". An interexchange carrier, in response to receipt of an 800 service call accompanied by a prefix digit other than the digit "1", will thus process the call in accord with the call treatment associated with the received prefix digit.

For example, a caller may obtain a telephone connection to a business location that is convenient to a telephone station set other than the calling station set by dialing a particular prefix code, e.g., the digit "0". In that case then, the digit "0" prefix code invokes a call treatment which causes the locator service to identify a business location convenient to the desired telephone station set.

As another example, the caller may enter a different prefix code, e.g., the digit "2", to invoke a call treatment that causes the associated interexchange carrier to process the associated 800 service call in accord with a particular grade of service.

BRIEF DESCRIPTION OF THE DRAWING

In the drawing;

FIG. I shows a block diagram of a telecommunications network in which the principles of the invention may be practiced;

FIG. 2 is an illustrative example of a translation table that may be used by an NCP of FIG. 1 to translate an 800 service telephone number and ANI into a destination telephone number; and FIG. 3 shows in flow chart form the program which implements the invention in the telecommunications network of FIG. 1.

DETAILED DESCRIPTION

Figure 1:
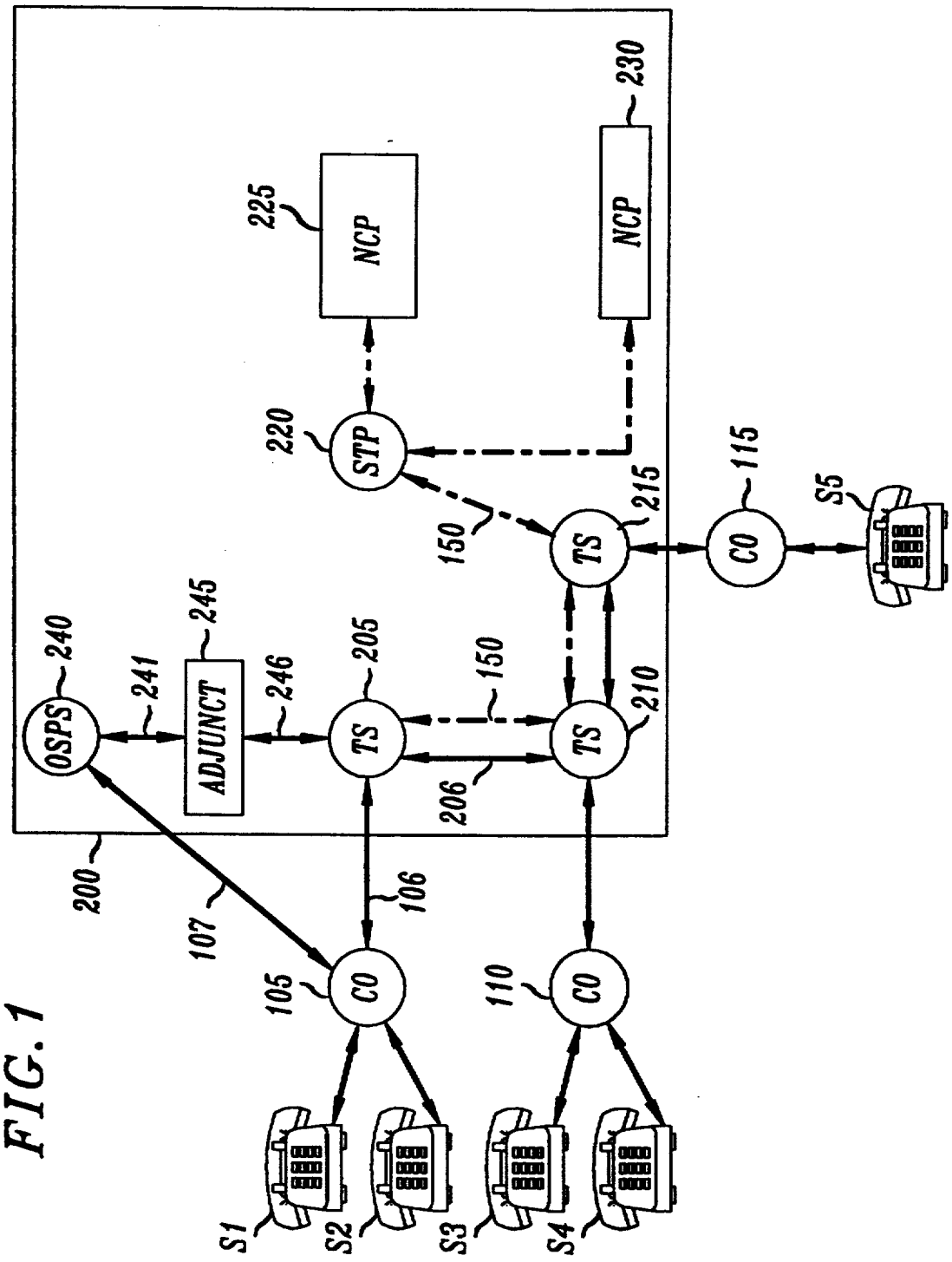

Turning now to FIG. 1, there is shown telecommunications network 200, which may be, for example, the AT&T public switched network, that provides a number of different calling services for its subscribers, e.g., the subscribers associated with stations S1 through S5.

Network 200 includes, inter alia, a plurality of interconnected Toll Switching (TS) offices, three of which are shown in the FIG., namely TS 205, 210 and 215. Such toll switches may be any one of a number of different well-known types of switching equipments, such as, for example, the No. 4ESS (Electronic Switching System) commercially available from AT&T. Such toll switches are also interconnected via data link 150, which may be a part of, for example, the well-known Common Channel Signaling network (CCS). The toll switches exchange data messages with one another via CCS network 150 in order to establish a telephone connection from an originating toll switch to a destination toll switch.

Each toll switch, e.g., TS 205, is also connected to one of a plurality of Central Offices (CO), such as CO 105. A CO is arranged to connect a calling telephone station (e.g., S1) which has dialed a particular telephone number outside of the calling area served by the CO to an associated toll switch, e.g., TS 205. A CO is also arranged to connect calls that it receives from associated toll switch (destination switch) to a called station, e.g., station S2.

Network 200 further includes a number of centralized databases commonly referred to as Network Control Points (NCP), which are commercially available from AT&T, and which support the provision of various network 200 services, such as 800 services. Such NCPs, for example, NCPs 225 and 230, are positioned at various locations within network 200 and are interconnected with the toll switches via CCS network 150 and various signal transfer points, such as Signal Transfer Point (STP) 220.

A subscriber, for example, a multilocation business customer associated with station sets S2 and S4, may subscribe to one or more such services, e.g., an 800 service. As a result thereof, the business customer is assigned a particular 800 telephone number, e.g., 800-abcd, associated with network 200, in which "abcd" is taken to mean herein a series, or string, of integers forming a respective telephone number. Assuming that "abcd" represents 949-5555, then the business customer may thereafter advertise the toll-free telephone number of 800-949-5555 and a telephone subscriber, in response thereto, may then dial that number to place a telephone call to the business customer.

In placing such a call, the telephone subscriber, e.g., the subscriber associated with station S 1, first dials the digit "1" as a prefix code to indicate that the call is a so-called Direct Distance Dialing (DDD) call. The subscriber then dials the desired 800 service number, i.e., 800-949-5000. CO 105, in turn, recognizes the 1-800 code and routes the call to TS 205 via an idle trunk of communications path 106. In doing so, CO 105 supplies, inter alia, the called telephone number (1-800-949-5555) as well as the telephone number of the calling telephone station set S1 (i.e, ANI) to TS 205. (It will be assumed herein that the station S1 telephone number is 908-370-eeee, where eeee represents the last four digits of that telephone number.)

Upon receipt of the 800 service telephone call, TS 205 forms a request message containing, inter alia, the calling and called telephone numbers and then transmits the request message to STP 220 via CCS network 150. STP 220 in a conventional manner routes the message to the appropriate NCP, e.g., NCP 225. NCP 225 in a conventional manner uses translation data stored in its internal memory to translate the called telephone number into a destination telephone number and returns that number to the originator of the request message, i.e., TS 205.

An illustrative simple example of such translation data is shown in FIG. 2 in the form of a conventional translation table 300 that is associated with the dialed 800 service. (It is noted that the letters shown in table 300, e.g., aaaa, represent numbers forming the last four digits of a telephone number.) One column of table 300 contains ANI and the other column contains a destination code or telephone number. NCP 225 uses the 800 service number and ANI information contained in the associated request message to access, in a conventional manner, an entry in table 300. In the present illustrative example, that entry would be entry 301 containing destination number 201-431-5555. Accordingly, NCP 225 supplies a copy of that destination number to TS 205 via STP 220.

TS 205, in turn, routes the associated telephone call to the destination number contained in the received response message, which number is assumed to be associated with station S2.

As mentioned above, it would be advantageous, in accord with an aspect of the invention, to present a caller with the option of specifying different call treatments for an 800 service call. Such an option could be implemented easily by assigning a number of different 800 service numbers associated with respective call treatments to a business customer. Such an approach, however, does not make efficient use of such 800 service numbers. Moreover, the business customer would most likely have to advertise all such numbers and their associated call treatments, rather than just one 800 service number, as is done currently. Alternatively, network 200 could be arranged so that it presents of menu of different call treatments to a caller that dials a particular 1-800 service number and then prompts the caller to select one of the menu items. Disadvantageously, the caller would be subjected to a litany of prompts each time he/she dials the particular 1-800 service number, which might eventually discourage the caller from calling the 800 service number.

We present a better approach, one which does not require a business customer to have a number of different 800 service numbers. Specifically, we associate a particular call treatment, in accord with an aspect of the invention, with a respective prefix digit, other than the digit "1". What this means is that 800 service calls dialed as 1-800-xxx-yyyy would be processed in a conventional manner, whereas such calls dialed as z-800-xxx-yyyy would be associated with a respective call treatment (where z represents a particular prefix value, or digit, other than "1", and is associated with a particular call treatment).

In particular, if, in the above example, the station S1 caller dials 0-800-949-5555 instead of 1-800-949-5555, then the caller is presented with the option of having the aforementioned 800 locator service identify a business location that is convenient to a telephone station other than station S1, for example, station S3 or S5. Assume then that the station S1 user dials 0-800-949-5555. CO 105, responsive to receipt of that number, determines from the "0" prefix that the call is to be extended to a network 200 Operator Service Position System (OSPS), e.g., OSPS 240, as is presently done for conventional "0+", or operator service calls. Accordingly, CO 105 extends the call to OSPS 240 via an idle trunk of trunk group 107. CO 105 also supplies, inter alia, the called telephone number and ANI to OSPS 240 via the established call connection. OSPS 240, in response to receipt of the call, determines from the called telephone number that the call is an 800 service call, rather than a call requesting operator assistance and, therefore, extends the call to adjunct 245 via an idle trunk of trunk group 241. Similarly, OSPS 240 passes, inter alia, the called telephone number and ANI to adjunct 245.

Adjunct 245, which may be, for example, a Conversant ® voice interactive system commercially available from AT&T, prompts the caller to enter the call treatment that the caller prefers, which call treatment is a request that the locator service identify a business location convenient to another telephone station, e.g., S3, rather than S1. To that end, the station S1 user, in response to the prompt, enters via the station S1 keypad information that will direct the locator service to identify the preferred business location. In accord with an illustrative embodiment of the invention, such information may be, for example, the telephone number, e.g., 609-905-iiii (where "iiii" represents respective digits), of the other station, which is assumed to be station S3. It is also assumed that the preferred business location is associated with station S4, which is located more conveniently to station S3 than to station S1.

Upon receipt of such information, adjunct 245 presents the call, as well as the called number, ANI, entered information, etc., to an associated toll switch, e.g., TS 205, via an idle trunk of trunk group 246. Since TS 205 receives the call via trunk group 246 rather trunk group 106, TS 205 recognizes that the call is associated with a particular call treatment. TS 205 also recognizes that the call is an 800 service call and, therefore, the telephone number of the destination is to be obtained from an associated NCP, e.g., NCP 225. Accordingly, TS 205 forms a request message, as discussed above, and sends the message to NCP 225 via STP 220. However, this time TS 205 inserts the caller-entered information (i.e., 609-905-iiii) in the message in place of the ANI information.

NCP 225, in response to receipt of the message, translates the 800 service number (i.e., 800-949-5555) and caller entered information into a destination telephone number. NCP 225, more particularly, indirectly indexes table 300 using the contents of the ANI field of the request message, which contents is 609-905-iiii. NCP 225, therefore, determines from table 300 that the destination telephone number is 908-698-5555 identifying station S4. Similarly, NCP 225 forms a response message containing the results of the translation and sends the message to TS 205 via STP 220.

Upon receipt of the response message, TS 205 routes the call to the destination toll switch, i.e., TS 210 via an idle trunk of trunk group 206. Switch TS 205 also passes, inter alia, the destination telephone number and ANI to TS 210 via network 150. TS 210, in turn, extends the call to CO 110 which completes the connection to station S4.

Thus, in accord with an aspect of the invention, the station S1 user is allowed to specify a call treatment that overrides the telephone number that is normally selected by the locator service selection process. Moreover, the caller is subjected to a prompt only when the caller dials a prefix other then the digit "1" and only when a respective call treatment requires the caller to enter particular information.

A specified call treatment may also be used to override other aspects that arise in the processing of a telephone call, such as, for example, a grade of service. Specifically, an 800 service caller may specify a higher grade of service than is normally accorded an 800 service call. What this means is that during periods of network congestion the caller's 800 service call may be given priority over other 800 service calls not associated with a caller-specified grade of service. In particular, an 800 service caller may specify a higher grade of service by dialing a predefined prefix code, e.g., the digit "2" and then dialing the desired 800 service number. Network 200, in response to receipt of that prefix code, processes the associated 800 service call in accord with the specified grade of service.

As another example, a caller may elect to pay for the cost of an associated 800 service call (or share the cost with the business customer) in exchange for a guaranty that the business customer will answer the call promptly or call the calling party back. This aspect of the invention is particularly advantageous in the situation where the business customer's telephone lines are typically busy and incoming calls are queued. A caller may avoid the queue, or be placed near the top of the queue, by first dialing a predefined prefix code, e.g., the digit "0", rather than the digit "1", and then dialing the business customer's 800 service number (0+ call). Network 200, in response thereto, then extends the call to a particular one of the business customers' telephone station sets that is used to answer 0+ calls.

Turning now to FIG. 3, there is shown in flow chart form the program which implements the principles of the invention in a telecommunications network, e.g., the network of FIG. 1. In particular, the program is entered at block 400 upon receipt of a toll free call. At block 400, the program proceeds to block 400-1 where it checks to see if the prefix digit of the telephone number associated with the incoming toll free call is a "1". If that is not the case, then the program proceeds to block 401. Otherwise, the program proceeds to block 400-2, where the call is processed in the manner discussed above. At block 401, the program prompts the caller to enter the desired information, in the manner discussed above. The program then enters a loop comprising blocks 402 and 406 where it waits a predetermined period of time, e.g., ten seconds, for the caller to begin the entering of the desired information. That is, at block 402, the program checks to see if it has begun receiving the caller information and proceeds to block 406 if it finds that is not the case. At block 406, the program checks an associated software timer to determine if the timer has timed out. If it has not, then the program returns to block 402 via path 407, in which the dotted portion of path 407 represents a software delay, e.g., a delay of 100 milliseconds. Otherwise, the program proceeds to block 408 where it terminates the call in a conventional manner and then exits.

If the program at block 402 finds that it has begun receiving the caller entered information it then collects that information and then proceeds to block 403 where it forms a request message for transmission to the appropriate NCP, as illustrated by block 404. In doing so, the program at block 403 substitutes the caller entered information for the ANI in the request message. The program then waits for a response from the associated NCP, e.g., NCP 225. Upon receipt of the response, the program then proceeds to block 405, where it routes the call in a conventional manner based on the contents of the response received from the associated NCP, as discussed above.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A method of processing a call in a communications system, said method comprising the steps of receiving from a first calling station the dialed digits 1 800 abcd, where abcd represents a respective string of integers forming a telephone number, completing a telephone call to a first destination telephone station associated with a telephone number derived as a function of said dialed digits and a telephone number associated with said calling station, receiving from a second calling station the dialed digits 0 800 abcd, where abcd is said respective string of integers, and completing a telephone call to a second destination telephone station associated with a telephone number derived as a function of said dialed digits and a telephone number associated with a telephone station other than said calling station.

2. A public switched telecommunications system comprising means for receiving a first telephone call associated with a sequence of dialed digits defining a first prefix digit followed by a telephone number, said telephone number being associated with a particular 800 service call, means for processing said first telephone call in accordance with a first call treatment associated with said first prefix digit, means for receiving a second telephone call associated with a sequence of dialed digits defining a second prefix digit followed by said telephone number, said second prefix digit being different from said first prefix digit, and means for processing said second telephone call in accordance with a second call treatment identified by said second prefix digit, said first and second call treatments being different from one another and being different from a telephone operator service.

3. The telecommunications system set forth in claim 2 wherein said first prefix digit is a one and said second prefix digit is a zero.

4. The communications system set forth in claim 2 wherein said second prefix digit has a value other than one.

5. A public switched telecommunications system comprising
   means for receiving a telephone call associated with dialed digits defining a particular prefix digit followed by a string of digits associated with a particular 800 service call, and
   means for translating said dialed string of digits into a first telephone number if said prefix digit is a "1" or a second telephone number if said prefix digit is a "0".

6. A telecommunications system comprising
   means for receiving a first telephone call associated with dialed digits defining a toll-free telephone number and defining a first prefix digit,
   means for forwarding said first toll-free telephone call to a first destination associated with a telephone number derived as a function of said toll-free telephone number and a telephone number associated with the originator of said first telephone call,
   means for receiving a second telephone call associated with dialed digits defining said toll-free telephone number and defining a second prefix digit different from said first prefix digit, and
   means for forwarding said second toll-free telephone call to a second destination associated with a telephone number derived as a function of said toll-free telephone number and another telephone number entered by the originator of said second telephone call.

7. A telecommunications system comprising
   means for receiving a telephone call associated with particular dialed digits defining a particular toll-free telephone number, said toll-free telephone number being assigned to a business customer of said system, said business customer being associated with a plurality of business locations and said dialed digits including a prefix digit, and
   means for forwarding said call to either a first telephone number associated with one of said locations if said prefix digit is a "1" or to a second telephone number associated with another one of said locations if said prefix digit is a "0".

* * * * *